United States Patent
Macdonald (10) Patent No.: US 9,342,415 B2
(45) Date of Patent: May 17, 2016

(54) RUN-TO-COMPLETION THREAD MODEL FOR SOFTWARE BYPASS FAIL OPEN FOR AN INLINE INTRUSION PROTECTION SYSTEM

(71) Applicant: International Business Machines Corporation, Armonk, NY (US)

(72) Inventor: Stuart John Macdonald, Littleton, CO (US)

(73) Assignee: International Business Machines Corporation, Armonk, NY (US)

( * ) Notice: Subject to any disclaimer, the term of this patent is extended or adjusted under 35 U.S.C. 154(b) by 158 days.

(21) Appl. No.: 14/330,412

(22) Filed: Jul. 14, 2014

(65) Prior Publication Data

US 2016/0011948 A1    Jan. 14, 2016

(51) Int. Cl.
*G06F 11/20*      (2006.01)
*H04L 29/06*      (2006.01)

(52) U.S. Cl.
CPC .......... *G06F 11/2028* (2013.01); *G06F 11/203* (2013.01); *G06F 11/2023* (2013.01); *G06F 2201/805* (2013.01); *H04L 63/1416* (2013.01)

(58) Field of Classification Search
CPC .............. G06F 11/2028; G06F 11/203; G06F 2201/805; G06F 11/2023; H04L 63/1416
See application file for complete search history.

(56) References Cited

U.S. PATENT DOCUMENTS

| | | | |
|---|---|---|---|
| 8,488,618 | B1 | 7/2013 | Mittal et al. |
| 2003/0084319 | A1 | 5/2003 | Tarquini et al. |
| 2010/0226383 | A1 | 9/2010 | Cothrell et al. |
| 2011/0211443 | A1 | 9/2011 | Leong et al. |
| 2011/0214181 | A1 | 9/2011 | Matityahu et al. |
| 2011/0289600 | A1* | 11/2011 | Rusakov ................ G06F 21/55 726/30 |
| 2013/0227685 | A1 | 8/2013 | McGee |
| 2014/0281348 | A1* | 9/2014 | Nayar ..................... G06F 12/02 711/173 |
| 2014/0317629 | A1* | 10/2014 | Stanfill ................ G06F 9/4843 718/102 |

FOREIGN PATENT DOCUMENTS

WO     WO2005050414     6/2005

OTHER PUBLICATIONS

Cisco; "Cisco Intrusion Prevention System Sensor CLI Configuration Guide for IPS 7.1", Chapter 5.
Piper; "Intrusion Prevention Systems for Dummies".
Agrawal, H., & Malhotra, R., "Device drivers in user space", retrieved from http://www.embedded.com/print/4401769 on May 22, 2014.
IBM Corp.; "IBM Internet Security Systems—IBM ISS Overview" presentation, retrieved on May 22, 2014 from www.ibm.com/jm/download/IBM_ISS_Overview.pdf.
Intel Corp.; "Network Connectivity—Receive Side Scaling on Intel Network Adapters", retrieved from http://www.intel.com/support/network/adapter/pro100/sb/cs-027574.htm on May 22, 2014.
Intel Corp.; "Intel Data Plane Development Kit (Intel DPDK) Overview Packet Processing on Intel Architecture"; retrieved on May 22, 2014 from http://www.intel.com/content/dam/www/public/us/en/documents/presentation/dpdk-packet-processing-ia-overview-presentation.pdf.
Webopedia; "The 7 Layers of the OSI Model"; retrieved from http://www.webopedia.com/quick_ref/OSI_Layers.asp on May 22, 2014.
Ine; "Control Plane vs. Data Plane"; retrieved on Jun. 11, 2014 from http://blog.ine.com/2011/06/15/control-plane-vs-data-plane/.
Intel Corp; "Intel Data Plane Development Kit (Intel DPDK) Programmer's Guide—Jan. 2014"; retrieved on Jun. 4, 2014 from www.intel.com/content/dam/www/public/us/en/documents/guides/intel-dpdk-programmers-guide.pdf, especially p. 45, section 8.3 and p. 47, section 8.5.1.
techtarget.com; "data plane (DP)"; retrieved from http://searchsdn.techtarget.com/definition/data-plane-DP on May 22, 2014.
IBM Corp.; "IBM Proventia Network Intrusion Prevention System—G/GX Appliance User Guide", May 27, 2008.
Redhat Corp.; "8.6 Receive-Side Scaling (RSS)"; retrieved on May 22, 2014 from: https://access.redhat.com/site/documentation/en-US/Red_Hat_Enterprise_Linux/6/html/Performance_Tuning_Guide/network-rss.html.
Wikipedia; "Run to completion scheduling"; retrieved from http://en.wikipedia.org/wiki/Run_to_completion_scheduling on May 22, 2014.
Wikipedia; "Segmentation fault"; retrieved on May 22, 2014 from http://en.wikipedia.org/wiki/Segmentation_fault.

\* cited by examiner

*Primary Examiner* — Bryce Bonzo
*Assistant Examiner* — Jonathan Gibson
(74) *Attorney, Agent, or Firm* — Robert H. Frantz; John J. Timar; David A. Mims, Jr.

(57) ABSTRACT

A processing-based bypass "fail open" mode is provided for an intrusion prevention system by a primary process running on a first logical core (lcore) is used as a control plane, which invokes bypass-open run-to-completion threads in other lcores comprising a bypass data plane, and which spawns a secondary process to fully configure intrusion prevention threads on other lcores to create an Intrusion Prevention System data plane. Upon a ready signal from the secondary process, the primary process quiesces such that the secondary process IPS data plane exclusively owns and executes on the other lcores.

20 Claims, 5 Drawing Sheets

RUN-TO-COMPLETION THREAD MODEL FOR SOFTWARE BYPASS FAIL OPEN FOR AN INLINE INTRUSION PROTECTION SYSTEM

FIELD OF THE INVENTION

This invention is related to systems, methods and computer program products for minimizing operational impact while maintaining integrity of data communication systems when an intrusion prevention system fails.

BACKGROUND OF INVENTION

In network interface card (NIC) terminology, the terms "fail open" and fail safe" are often used differently than in the terminology of electrical switches. When a firewall "fails open", it appears like a door which is blocked or propped open so that all network traffic flows through the firewall unimpeded (and unchecked). If an electrical switch "fails open", it does not provide a complete electrical path between the poles, so no signal passes through it (e.g., antonymous from the network interface usage).

Similarly, when a NIC "fails closed", it is thought of as a closed door, thus unselectively blocking all traffic through it. But, when an electrical switch fails closed, it provides an uninterrupted electrical path between the poles of the switch.

For the purposes of this disclosure, we will be using the network interface definitions of these terms, not the electrical circuit definitions, whereas the invention relates not to the physical layer of a communication stack (e.g., metallic, optical, wireless, etc.) such as layer 1 of the seven-layer Open System Interconnection (OSI) model, but to the layers above the physical layer. In order for a network interface device such as a router, firewall, etc., to "fail open", it must actively conduct formatted data, not just electrical signal, such as layers 2 through 6, e.g., data link, network, transport, session and presentation layers, respectively. As such, in this manner of usage, "failing open" and "failing closed" is more of a functional and operational mode than it is an electrical conductivity state.

SUMMARY OF THE DISCLOSED EMBODIMENTS

A processing-based bypass "fail open" mode is provided for an inline intrusion prevention system by a primary process running on a specified logical core (lcore) used as a control plane configuring and invoking one or more bypass-open run-to-completion (RTC) threads in other specified lcores comprising a bypass data plane, and spawns a secondary process which fully configures intrusion prevention threads on the same lcores used by the bypass data plane which comprises the Intrusion Prevention System (IPS) data plane. Upon a signal from the secondary process, the primary process bypass data plane quiesces, and the secondary process IPS data plane exclusively owns and executes on the data plane lcores.

BRIEF DESCRIPTION OF THE DRAWINGS

The figures presented herein, when considered in light of this description, form a complete disclosure of one or more embodiments, wherein like reference numbers in the figures represent similar or same elements or steps.

FIG. 2b shows a physical arrangement of the cluster of FIG. 2a.

DETAILED DESCRIPTION

Problems Recognized

As previously mentioned, it is important for network designers, installers, and administrators to know and control the failure modes of an appliance cluster. Some units allow fail-open and fail-closed option selection, and others provide a fixed failure mode. For example, IBM® has been designing a series Intrusion Prevention Systems (IPS) (e.g., G, GX and XGS®) to fail open or closed based on an unanalyzed frame policy setting when an internal Deep Packet Inspection (DPI) process crashes or is administratively terminated. In previous designs of this line of IPS units, for example, the fail open/closed implementation entailed one internal process comprised of one or more driver threads servicing the internal Network Interface Chip (NIC) and using shared memory queues to communicate with a separate DPI process comprised of one or more threads. In such an implementation, each driver thread typically runs exclusively on one or more logical cores (lcore) of one or more hardware processors and can provide the fail open failure mode in the event the IPS process terminates.

For example, one of the latest IPS product, XGS®, from IBM line uses hardware bypass circuits within the Network Management cards of the IPS, which fail open or closed on a per-port basis. However, to fully engage the hardware bypass functionality from the point of a detected failure can take anywhere from one to ten seconds to complete.

Figure 2A:
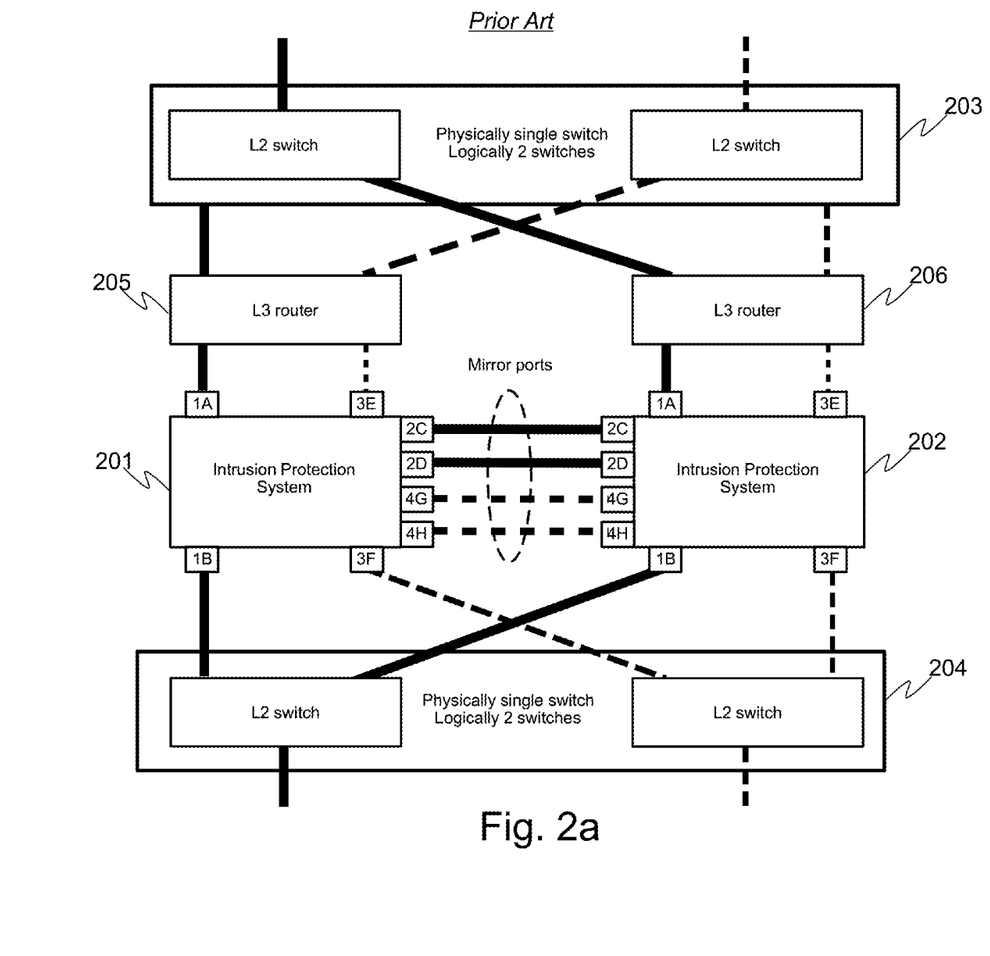
FIG. 2a illustrates a logical cluster of network appliances.
Figure 2B:
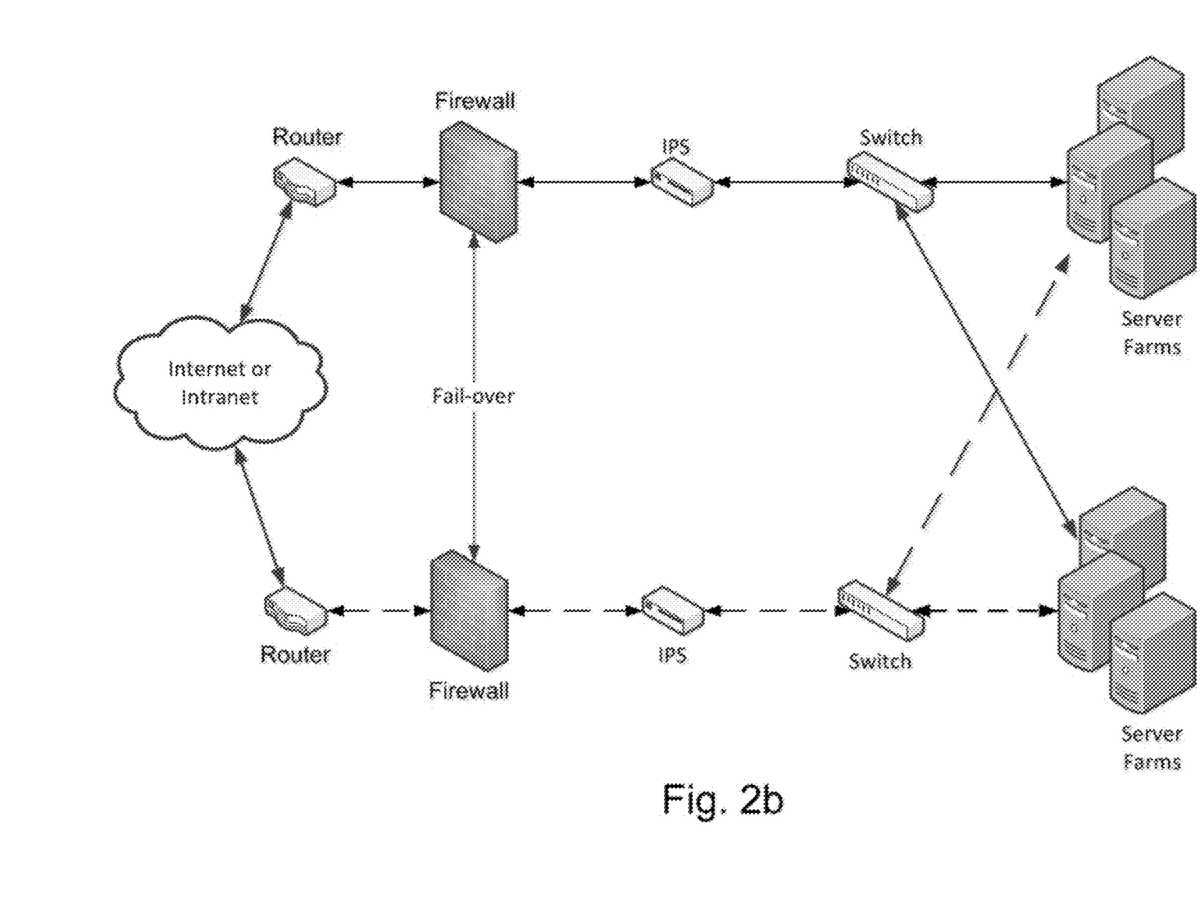

FIGS. 2a and 2b provide a logical diagram and physical network topology, respectively, for a typical high-availability (HA) arrangement of components using an Intrusion Prevention System (IPS) such as an IBM® Proventia XGS® IPS. Similar logical and physical configurations using other brands or models of IPS are possible, as is well known by those in the art. Using an administrator panel or tool, such as IBM® Proventia® Local Management Interface or Site Protector, a user can manage the HA appliance cluster to configure which ports are monitored and mirrored. As in the exemplary diagram of FIG. 2a, two physical switches (203, 204) can contain two logical layer 2 switches. Two separate IPS units (201, 202) share mirrored ports as well as one cross connected monitored port, such as port 3E on the leftmost IPS (201) and port 1A on the rightmost IPS (202) which are connected to the layer 3 routers (205, 206). One can see in this diagram two separate paths and their fail-over options by following the solid network lines and the dashed network lines.

Referring now to FIG. 2b, an HA physical representation of an appliance cluster is shown corresponding to the logical example of FIG. 2a. A network (Internet, intranet, etc.) is connected to a pair of routers and firewalls, between which a fail-over communication path is provided. The IPS units are serially connected between the firewall units and two switches, which are also cross connected to the server farms. Those familiar with these arts will find this arrangement typical, except possibly for the addition of the IPS units. IPS units in general are also well known among those who use them in their data arrangements.

With reference to the background discussion of "failing open" and "failing closed" for NIC devices, which are embedded in all of these units (e.g., routers, switches, firewalls, IPS, etc.), network designers, installers and administrators must be cognizant of all the capabilities and option settings on each unit in order to know and control the expected failure operations of the appliance cluster.

The inventors have recognized a problem in the art with the advent of UNIX user-space Network Interface drivers, Receive Side Scaling (RSS) and Receive Flow Steering (RFS) capabilities in newer Network Interfaces chipsets in that these IPS architectures become inferior performance-wise to a Run-To-Completion (RTC) threading model. In an RTC architecture, each thread/lcore services one or more NIC hardware queues and, for each received frame, calls a Deep Packet Inspection (DPI) function. There are no lcores dedicated to being a driver thread so more lcores can be used for IPS processing. There is no intermediate queuing, thus reducing latencies and increasing throughput. When complete, it drops the frame or Interfaces with the NIC to transmit the frame.

However, in an RTC architecture where all threads belong to the same process, if one thread throws a critical exception, the entire process can crash and must be restarted. During the time of the communication outage, the IPS device fails and customer networks may be adversely impacted because all traffic is blocked (failed closed).

The inventors have recognized this as a major flaw with the RTC threading model for which they set out to overcome without compromising performance.

Terminology and Technology

In the following description of processes, apparatuses, and computer program products, certain standard and proprietary technologies may be incorporated, coordinated and otherwise combined to yield some of the functionality according to the invention.

Deep Packet Inspection (DPI) may comprise one or more processes which provide analysis of data communications packets, their origins, their destinations, and their contents in an attempt to detect an intrusion or attack.

Intrusion Prevention System (IPS) may comprise one or more appliance components which are typically micro-processor based with suitable network interface circuitry, and which perform DPI and optionally other types of network threat mitigation and access functionality, such as the IBM® G, GX and XGS units and similar appliances from other vendors and manufacturers.

Network Interface Chipset (NIC) or Card is a sub-assembly within an appliance such as an IPS, router, firewall, etc., that provides a physical connection to a wired, optical, or wireless data communications network, and which typically includes processing at one or more of the lower layers of a communication protocol stack such as the OSI seven-layer stack.

Run-to-Completion (RTC) is a microprocessor task scheduling model in which an executing task, process, or thread has control of the microprocessor until it completes.

A Data Plane Development Kit (DPDK), such as one available from Intel® corporation, refers to the software tools, kits, and model programming code that can support an RTC or a pipeline model of processing communications data such as packetized data. In the case of the Intel DPDK for the current model of Intel NIC's, there is no scheduler provided by the processor, and it supports any number of cores and processors such as the Intel® and Xeon® processors Similar NIC providers offer similar DPDK products to assist developers in using their NIC products in optimal ways.

Receive Side Scaling (RSS) is a mechanism in which network or transport layers such as Internet Protocol Version 4 or Version 6 receive data processing may be spread across multiple processors and processor cores, as is the case on the NIC's supplied by Intel® corporation. RSS is supported by a variety of NIC vendors and operating systems, such as various UNIX® and UNIX-like (e.g., LINUX, SOLARIS, AIX, etc.) operating systems as well as by Microsoft's Windows® operating system.

Segmentation Fault (segfault) is a type of access violation in protected memory detected by microprocessing hardware. An operating system kernel typically initiates a corrective response, such as by sending a signal to the offending process, thread, or task, or by invoking a particular handler process.

Embodiments may use any individual or a combination of these technologies, optionally with or without proprietary technologies, as will be evident in the following paragraphs which will utilize the IBM IPS architecture for illustrative purposes only.

Overview of the Embodiments

A first available embodiment utilizes the existing hardware design of an IBM G®, GX® or XGS IPS, or a similar IPS system, and provides certain improvements and changes to the device, such as improvements to executable program code, circuitry, and logic of the IPS unit, to enhance the responsiveness of the fail-over mechanism by reducing the outage time, dedicating all data plane lcores to IPS function and by providing a quicker reconfiguration and restarting of the DPI processes following a crash.

An exemplary embodiment employs a NIC DPDK architecture, such as the Intel NIC DPDK, with a RTC thread model which detects an Inline IPS crash. Within milliseconds instead of tens of seconds, this embodiment has been verified to engage a processor-performed bypass data plane providing a fail open/close capability using a common set of data plane logical processing cores (lcores) until the IPS process running DPI can be reloaded. When the DPI threads comprising the IPS data plane have been successfully restarted, they resume processing of frames and full intrusion detection is in effect.

This approach avoids the cost and timing delays of the current hardware-based bypass mechanism, and it increases the overall performance of the enhanced IPS products by allowing an RTC threading model while makes the utmost utilization of a system's resources by not having under-utilized lcores.

Making a Feature Out of a Limitation

The present embodiment is particularly novel and nonobvious to those skilled in the relevant arts because a DPDK with Polled Mode Device drivers, such as the Intel® NIC DPDK, support primary and secondary process mode operation, but lcores and network ports cannot be shared across multiple processes according to the relevant manufacturer's Programmer Reference Manual. The exemplary embodiments disclosed herein, however, overcome this limitation without a performance cost by sharing lcores and providing mutual exclusivity of use of each process of each lcore and network port.

When the primary control plane seeks to stop the primary bypass data plane, each thread in the primary bypass data plane is allowed to complete any calls into the DPDK before the process is quiesced. Likewise, upon failure of the secondary IPS data plane, all threads except the one which crashed complete their DPDK function calls and then stop. The thread which crashed will be killed by the OS. A single lcore will have both a bypass and IPS data plane thread assigned to it with each belonging to the primary and secondary processes, respectively, but only one will be accessing network queues at any given point in time.

Sharing the lcores in the manner described in the following paragraphs provides an advantage in that there are no idle lcores at any point in time. In the present embodiment, a primary process (Process$^1$) provides a processing-based bypass capability, and a secondary process (Process$^2$) provides the full Intrusion prevention System capability.

Logical Process Embodiment

As previously mentioned, modifications or upgrades to the program code stored by and executed by an existing IPS unit hardware platform yields at least one embodiment of the present invention. Other embodiments include silicon design changes to NIC's themselves to implement the following logical processes, as well as program code coupled with new or other hardware computing platforms.

Figure 1A:
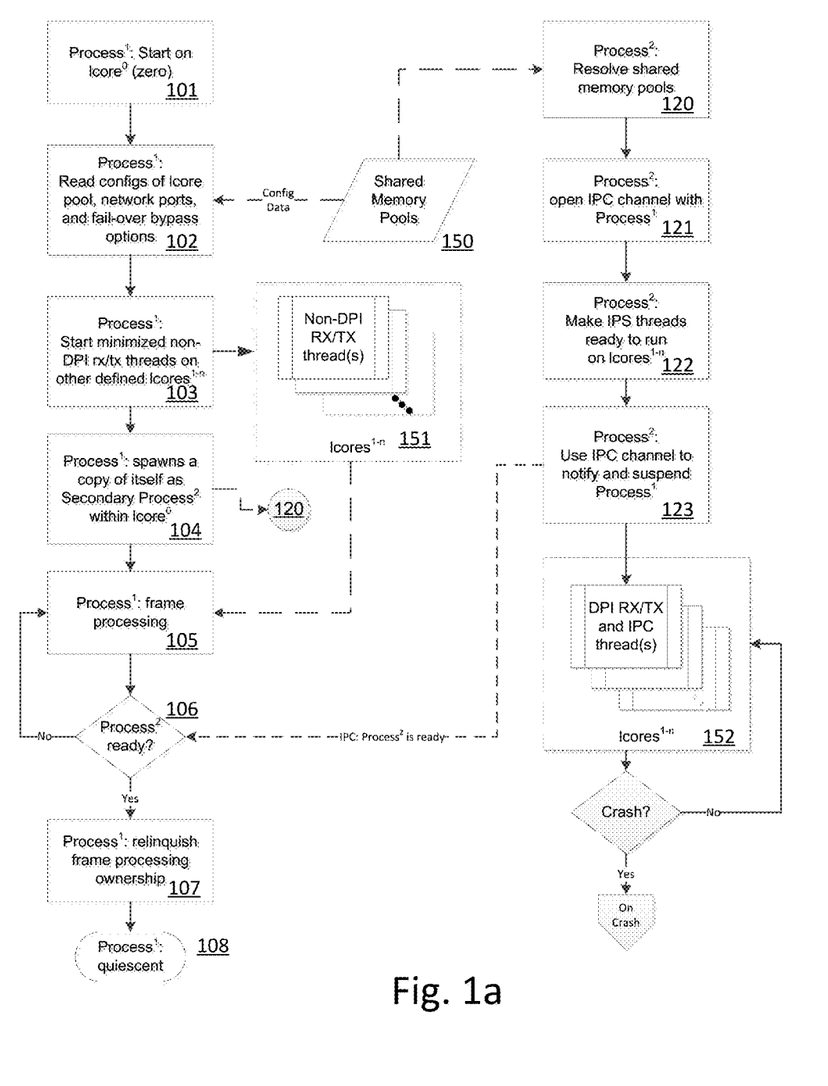
FIGS. 1a and 1b set forth a logical process of at least one embodiment.

Referring now to FIG. 1a, a primary process control plane running on a lcore, starts (101), reads (102) configuration data defining a pool of lcores, network ports and bypass characteristics from what will become a shared memory pool or pools (150). The primary process is responsible for DPDK resource allocation, allocating shared memory pools and bringing up of network ports. All software/hardware I/O control structures reside in the shared memory pools (150) according to this embodiment. It should be noted that a common lcore, 0, will be used as a control plane by both primary and secondary DPDK processes which consumes little central processing unit (CPU) bandwidth to manage.

The primary process then starts (103) one or more highly simplistic non-DPI receive/transmit threads (151) on the other defined data plane lcores. At this point the software bypass mechanism is fully engaged as the non-DPI receive/transmit threads (151) are either simply forwarding packets without inspection (e.g., fails open) or blocking all packets without regard to policy or content of the packets (e.g., failed closed). This is the bypass data plane. The bypass data plane will fail open or closed based on a configurable unanalyzed policy on a port-by port basis.

The primary process spawns (104) the secondary process, which can be performed by simply copying itself and invoking the copy. In the former embodiment, the primary and secondary processes are different code images, and in the latter embodiment, the two processes can be the same code image.

The secondary process resolves (120) the shared memory pools using the DPDK API's. The secondary process reads the same configuration data (120) and opens up an IPC channel (121) with the primary process. Through a defined control plane protocol which ensures mutual exclusivity of resources, the secondary process is initialized and all IPS threads (152) are readied (122) using the same lcores as the matching primary RxTx threads. As an example, a given thread in the bypass data plane running on lcore 5, will provide bypass service for a matching IPS data plane thread also running on lcore 5. Once the secondary process is ready to take over from the primary process which is processing frames minimally (105) and waiting (106) for the secondary process, the secondary process notifies (123) the primary process via the IPC channel. The primary process then relinquishes (107) ownership of the ports once each of its data plane threads returns from any current DPDK function calls and stops its frame processing duties to become quiescent (108).

At this juncture, the secondary process containing the IPS data plane has exclusive control of the Rx/TX lcores and network ports and owns all further frame processing responsibilities (152).

Figure 1B:
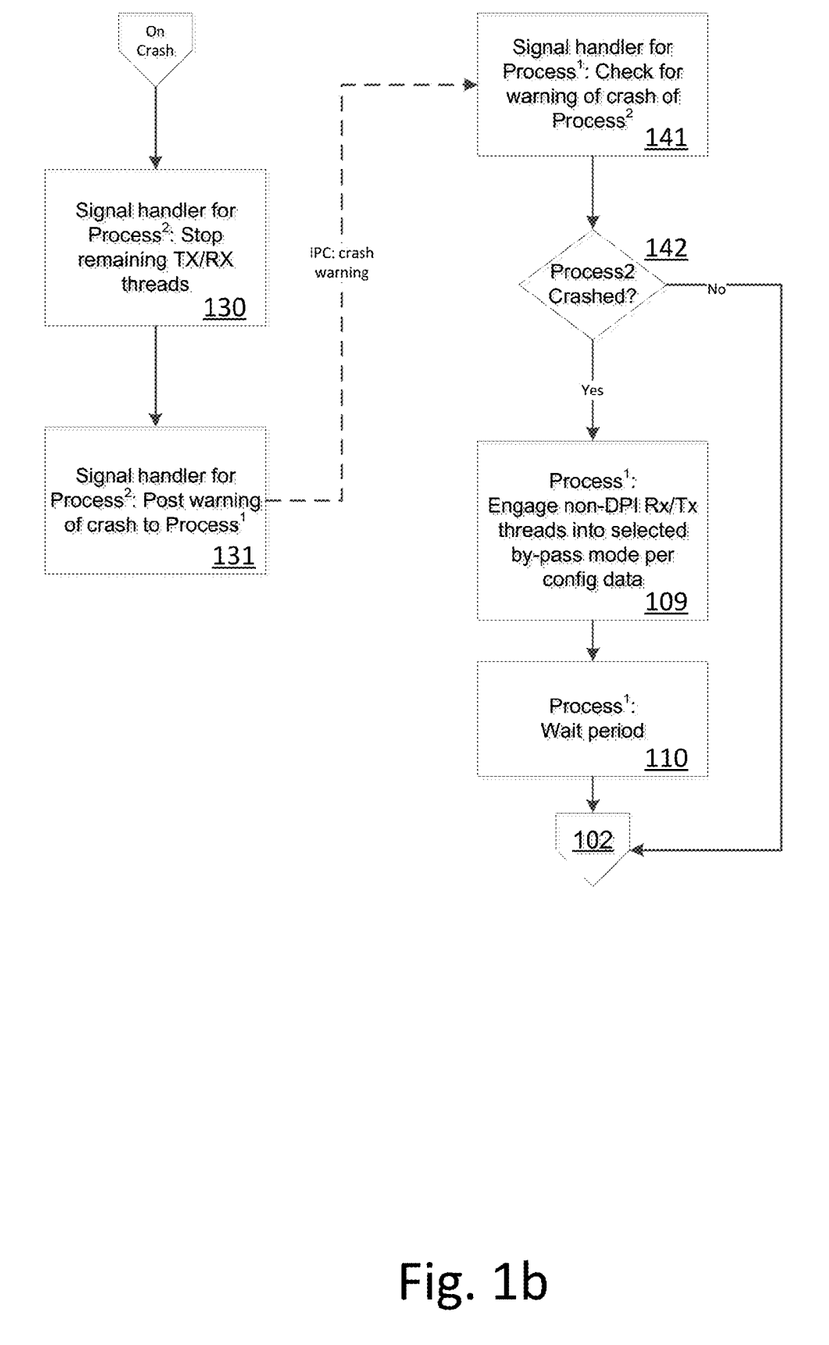

In the event that the secondary process crashes, the secondary process signal handler is called, e.g., SIGSEGV in UNIX implementations. The handler for such is implemented in the secondary IPS control plane. Turning now to FIG. 1b, the secondary process signal handler(s) stops (130) the remaining RxTx threads allowing any current DPDK call to return, and, using the IPC, warns the primary process of the crash.

When the primary bypass control plane which implements the IPC endpoint receives the notification of secondary IPS data plane termination, it will set a flag indicating that the primary was warned and that the secondary has performed an orderly stoppage of all IPS data plane threads.

When the primary process' signal handler (141) runs, e.g., SIGCHLD in UNIX implementations, if (142) the primary process was previously warned, then the primary process immediately engages (109) the receive/transmit bypass fail open or fail closed capability. In tests performed on actual implementations, the communication down time is observed to be less than a millisecond for the former, and approximately 1.5 to 2.0 seconds for the latter. After a configurable delay (110), the primary process then restarts (102) the secondary IPS process and the processes repeat as previously described.

If (142) the primary process was not warned of a crash, then it first restarts (102) each of the ports per the configuration and resumes the receive/transmit capability as previously described for the bypass data plane.

Computer Program Product

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

Suitable Computing Platform

The preceding paragraphs have set forth example logical processes according to the several disclosed exemplary embodiments, which, when coupled with processing hardware such as microprocessors, custom integrated circuits and programmable logic devices, embody systems according to the present invention, and which, when coupled with tangible, computer readable memory devices, embody computer program product embodiment.

Regarding computers for executing the logical processes set forth herein, it will be readily recognized by those skilled in the art that a variety of computers are suitable and will become suitable as memory, processing, and communications capacities of computers and portable devices increase. In such embodiments, the operative invention includes the combination of the programmable computing platform and the programs together. In other embodiments, some or all of the logical processes may be committed to dedicated or specialized electronic circuitry, such as Application Specific Integrated Circuits or programmable logic devices.

Figure 3:
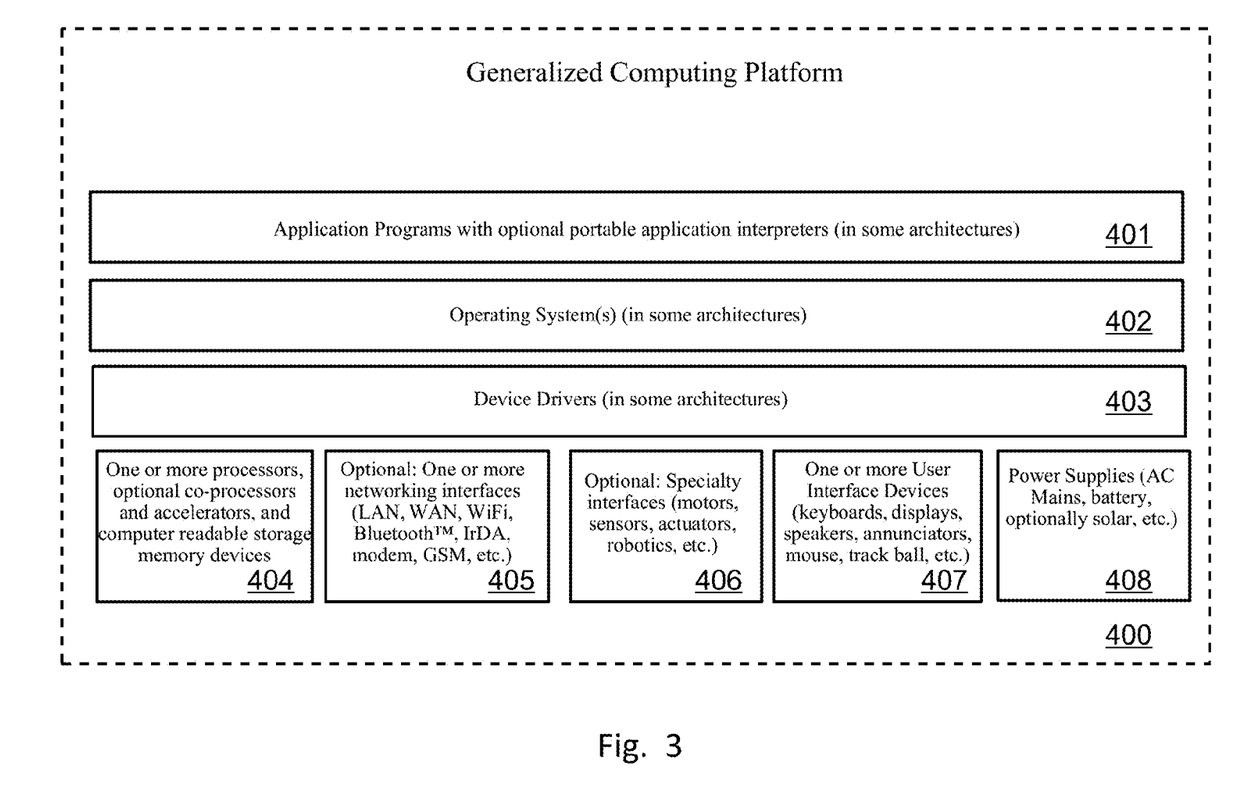
FIG. 3 depicts a generalized computing platform suitable for combination with program instructions to perform the logical processes shown and described herein.

Embodiments may be realized for many different processors used in many different computing platforms. FIG. 3 illustrates a generalized computing platform (400), such as common and well-known computing platforms such as "Personal Computers", web servers such as an IBM iSeries® server, and portable devices such as personal digital assistants and smart phones, running a popular operating systems (402) such as Microsoft® Windows® or IBM AIX®, UNIX®, LINUX®, Google® Android®, Apple® iOS®, and others, may be employed to execute one or more application programs to accomplish the computerized methods described herein. Whereas these computing platforms and operating systems are well known and openly described in any number of textbooks, websites, and public "open" specifications and recommendations, diagrams and further details of these computing systems in general (without the customized logical processes of the present invention) are readily available to those ordinarily skilled in the art.

Many such computing platforms, but not all, allow for the addition of or installation of application programs (401) which provide specific logical functionality and which allow the computing platform to be specialized in certain manners to perform certain jobs, thus rendering the computing platform into a specialized machine. In some "closed" architectures, this functionality is provided by the manufacturer and may not be modifiable by the end-user.

The "hardware" portion of a computing platform typically includes one or more processors (404) sometimes accompanied by specialized co-processors or accelerators, such as graphics accelerators, and by suitable computer readable memory devices (RAM, ROM, disk drives, removable memory cards, etc.). Depending on the computing platform, one or more network interfaces (405) may be provided, as well as specialty interfaces for specific applications. If the computing platform is intended to interact with human users, it is provided with one or more user interface devices (407), such as display(s), keyboards, pointing devices, speakers, etc. Each computing platform requires one or more power supplies (battery, AC mains, solar, etc.).

CONCLUSION

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof, unless specifically stated otherwise.

The corresponding structures, materials, acts, and equivalents of all means or step plus function elements in the claims below are intended to include any structure, material, or act for performing the function in combination with other claimed elements as specifically claimed. The descriptions of the disclosed embodiments have been presented for purposes of illustration, but they are not intended to be exhaustive or limited to the invention in the form disclosed. Many modifications and variations will be apparent to those of ordinary skill in the art without departing from the scope and spirit of the invention. The disclosed embodiments were chosen in order to explain principles and practical applications, and to enable others of ordinary skill in the art to understand the various embodiments with various modifications which may be suited to other particular uses.

It should also be recognized by those skilled in the art that certain embodiments utilizing a microprocessor executing a logical process may also be realized through customized electronic circuitry performing the same logical process or processes.

It will be readily recognized by those skilled in the art that the foregoing example embodiments do not define the extent or scope of the invention, but instead are provided as illustrations of how to make and use at least one embodiment of the invention. The following claims define the extent and scope of at least one invention disclosed herein.

What is claimed is:

1. A method of providing a bypass fail open mode for an inline intrusion prevention system comprising the steps of:
   executing by one or more processors a primary process utilizing a first single logical core as a control plane, the primary process;
   configuring one or more logical core pools, two or more network ports, and a bypass option;
   starting one or more bypass threads on at least one logical core separate from the first single logical core, wherein the bypass threads provide a fail-open communications processing between the network ports; and
   spawning a secondary process;
   while the primary process owns and performs frame processing using one or more bypass data plane threads:
   opening an interprocess communication channel by a secondary process control plane with the primary control plane;
   initializing and invoking by the secondary process one or more intrusion prevention threads comprising an intrusion prevention system data plane, wherein the one or more intrusion prevention threads are executed by one or more logical cores separate from the first logical core to process frames between the network ports; and
   notifying the primary process by the secondary process via the interprocess communication channel of readiness of the intrusion detection threads; and
   responsive to receiving the notification, the primary process relinquishing ownership of the network ports and frame processing operations and entering into a quiescent state such that mutual exclusivity between the primary process and the secondary process is achieved in the first logical core.

2. The method as set forth in claim 1 further comprising, subsequent to the relinquishing and responsive to a signal handler being invoked by an exception in processing of the secondary process control plane or in the intrusion detection threads:
   posting a warning in the interprocess communication channel;
   stopping the intrusion prevention threads and the secondary process; and
   resuming the primary process bypass data plane, wherein upon detecting the warning in the interprocess communication channel, the step of starting the bypass thread is repeated, thereby retaining mutual exclusivity in logical cores shared by the respective data planes and engaging the fail-open communication communications processing between the network ports as defined in a port-specific Unanalyzed policy.

3. The method as set forth in claim 2 further comprising, subsequent to the resuming of the primary process and engaging the fail-open communications processing, repeating the steps of spawning a secondary process, opening an interprocess communication channel, initializing and invoking intrusion prevention threads, and notifying the primary process by the secondary process of readiness of the intrusion prevention threads such that the primary process again relinquishes ownership of the network ports and frame processing operations and enters into a quiescent state, thus again restoring mutual exclusivity between the primary process and the secondary process.

4. The method as set forth in claim 1 wherein the invoking of intrusion prevention threads comprises invoking a deep packet inspection process or thread.

5. The method as set forth in claim 1 wherein the signal handler comprises an exception signal handler which is triggered upon a detection of a crash of a thread on the at least one logical core separate from the first single logical core.

6. The method as set forth in claim 5 wherein the detection of a crash comprises a segmentation violation detection.

7. The method as set forth in claim 5 wherein the primary process and the secondary process communicate and cooperate with a user-space network interface chipset driver.

8. A computer program product for providing a bypass fail open mode for an inline intrusion prevention system, the computer program product comprising a computer readable storage medium having program instructions embodied therewith, the program instructions executable by one or more processors of an intrusion prevention system to cause the system to perform steps comprising:
executing by one or more processors a primary process utilizing a first single logical core as a control plane, the primary process;
configuring one or more logical core pools, two or more network ports, and a bypass option;
starting one or more bypass threads on at least one logical core separate from the first single logical core, wherein the bypass threads provide a fail-open communications processing between the network ports; and
spawning a secondary process;
while the primary process owns and performs frame processing using one or more bypass data plane threads:
opening an interprocess communication channel by a secondary process control plane with the primary control plane;
initializing and invoking by the secondary process one or more intrusion prevention threads comprising an intrusion prevention system data plane, wherein the one or more intrusion prevention threads are executed by one or more logical cores separate from the first logical core to process frames between the network ports; and
notifying the primary process by the secondary process via the interprocess communication channel of readiness of the intrusion detection threads; and
responsive to receiving the notification, the primary process relinquishing ownership of the network ports and frame processing operations and entering into a quiescent state such that mutual exclusivity between the primary process and the secondary process is achieved in the first logical core.

9. The computer program product as set forth in claim 8 wherein the program instructions further comprise program instruction to, subsequent to the relinquishing and responsive to a signal handler being invoked by an exception in processing of the secondary process control plane or in the intrusion detection threads, cause the system to perform steps comprising:
posting a warning in the interprocess communication channel;
stopping the intrusion prevention threads and the secondary process; and
resuming the primary process bypass data plane, wherein upon detecting the warning in the interprocess communication channel, the step of starting the bypass thread is repeated, thereby retaining mutual exclusivity in logical cores shared by the respective data planes and engaging the fail-open communication communications processing between the network ports as defined in a port-specific Unanalyzed policy.

10. The computer program product as set forth in claim 9 wherein the program instructions further comprise program instruction to, subsequent to the resuming of the primary process and engaging the fail-open communications processing, cause the system to repeat the steps of spawning a secondary process, opening an interprocess communication channel, initializing and invoking intrusion prevention threads, and notifying the primary process by the secondary process of readiness of the intrusion prevention threads such that the primary process again relinquishes ownership of the network ports and frame processing operations and enters into a quiescent state, thus again restoring mutual exclusivity between the primary process and the secondary process.

11. The computer program product as set forth in claim 8 wherein the program instructions to invoke of intrusion prevention threads comprise program instructions to invoke a deep packet inspection process or thread.

12. The computer program product as set forth in claim 8 wherein the signal handler comprises an exception signal handler which is triggered upon a detection of a crash of a thread on the at least one logical core separate from the first single logical core.

13. The computer program product as set forth in claim 12 wherein the detection of a crash comprises a segmentation violation detection.

14. The computer program product as set forth in claim 12 wherein the primary process and the secondary process communicate and cooperate with a user-space network interface chipset driver.

15. A system for providing a bypass fail open mode for an inline intrusion prevention system comprising:
one or more processors for executing program instructions of an intrusion prevention system; and
a computer readable storage medium having program instructions embodied therewith, the program instructions executable by the one or more processors to cause the intrusion prevention system to perform steps comprising:
executing by one or more processors a primary process utilizing a first single logical core as a control plane, the primary process;
configuring one or more logical core pools, two or more network ports, and a bypass option;
starting one or more bypass threads on at least one logical core separate from the first single logical core, wherein the bypass threads provide a fail-open communications processing between the network ports; and
spawning a secondary process;
while the primary process owns and performs frame processing using one or more bypass data plane threads:
opening an interprocess communication channel by a secondary process control plane with the primary control plane;
initializing and invoking by the secondary process one or more intrusion prevention threads comprising an intrusion prevention system data plane, wherein the one or more intrusion prevention threads are executed by one or more logical cores separate from the first logical core to process frames between the network ports; and
notifying the primary process by the secondary process via the interprocess communication channel of readiness of the intrusion detection threads; and
responsive to receiving the notification, the primary process relinquishing ownership of the network ports and frame processing operations and entering into a quiescent state such that mutual exclusivity between the primary process and the secondary process is achieved in the first logical core.

16. The system as set forth in claim 15 wherein the program instructions further comprise program instruction to, subsequent to the relinquishing and responsive to a signal handler being invoked by an exception in processing of the secondary process control plane or in the intrusion detection threads, cause the system to perform steps comprising:

posting a warning in the interprocess communication channel;

stopping the intrusion prevention threads and the secondary process; and resuming the primary process bypass data plane, wherein upon detecting the warning in the interprocess communication channel, the step of starting the bypass thread is repeated, thereby retaining mutual exclusivity in logical cores shared by the respective data planes and engaging the fail-open communication communications processing between the network ports as defined in a port-specific Unanalyzed policy.

17. The system as set forth in claim 16 wherein the program instructions further comprise program instruction to, subsequent to the resuming of the primary process and engaging the fail-open communications processing, repeat the steps of spawning a secondary process, opening an interprocess communication channel, initializing and invoking intrusion prevention threads, and notifying the primary process by the secondary process of readiness of the intrusion prevention threads such that the primary process again relinquishes ownership of the network ports and frame processing operations and enters into a quiescent state, thus again restoring mutual exclusivity between the primary process and the secondary process.

18. The system as set forth in claim 15 wherein the program instructions to invoke of intrusion prevention threads comprise program instructions to invoke a deep packet inspection process or thread.

19. The system as set forth in claim 15 wherein the signal handler comprises an exception signal handler which is triggered upon a detection of a crash of a thread on the at least one logical core separate from the first single logical core.

20. The system as set forth in claim 19 wherein the detection of a crash comprises a segmentation violation detection.

* * * * *